(12) United States Patent
Bittlingmaier et al.

(10) Patent No.: US 8,955,623 B2
(45) Date of Patent: Feb. 17, 2015

(54) HUB ASSEMBLY, IN PARTICULAR FOR DUAL WHEELS

(75) Inventors: Günter Bittlingmaier, Ebnat (DE); Thomas Bauer, Aalen (DE)

(73) Assignee: Kessler & Co. GmbH & Co. KG, Abtsgmünd (DE)

( * ) Notice: Subject to any disclaimer, the term of this patent is extended or adjusted under 35 U.S.C. 154(b) by 0 days.

(21) Appl. No.: 14/127,627

(22) PCT Filed: Jun. 14, 2012

(86) PCT No.: PCT/EP2012/061306
§ 371 (c)(1),
(2), (4) Date: Dec. 19, 2013

(87) PCT Pub. No.: WO2013/000723
PCT Pub. Date: Jan. 3, 2013

(65) Prior Publication Data
US 2014/0125112 A1 May 8, 2014

(30) Foreign Application Priority Data

Jun. 27, 2011 (DE) .......................... 10 2011 078 132

(51) Int. Cl.
*B62D 1/10* (2006.01)
*B60K 17/36* (2006.01)
*B60T 1/06* (2006.01)
*B60B 11/02* (2006.01)
*B60B 11/06* (2006.01)
*B60B 27/00* (2006.01)
*B60K 17/04* (2006.01)

(52) U.S. Cl.
CPC ............ *B60B 27/0052* (2013.01); *B60B 11/02* (2013.01); *B60K 17/046* (2013.01)

USPC ........ 180/24.03; 180/370; 301/36.2; 301/6.8; 188/71.4; 188/71.5; 188/72.4; 188/106 A; 188/106 P

(58) Field of Classification Search
USPC .............. 180/24.03, 370; 301/36.1, 36.2, 6.1, 301/6.8, 13.1, 13.2; 188/71.4, 71.5, 72.4, 188/106 A, 106 P
See application file for complete search history.

(56) References Cited

U.S. PATENT DOCUMENTS

| | | | | |
|---|---|---|---|---|
| 2,132,029 A * | 10/1938 | Higbee | ................ | 188/18 A |
| 2,222,695 A * | 11/1940 | Velo | .............. | 192/3.61 |
| 2,267,362 A | 12/1941 | Ash | | |
| 2,268,329 A | 12/1941 | Ash | | |
| 2,304,774 A * | 12/1942 | Ash | ............. | 188/18 A |
| 2,345,192 A | 3/1944 | Garnett et al. | | |
| 2,401,488 A * | 6/1946 | Lewis | ........... | 180/24.03 |
| 6,527,073 B1 * | 3/2003 | Bowman et al. | ........... | 180/24.03 |
| 7,757,795 B2 * | 7/2010 | Chien et al. | ................ | 180/24.03 |

FOREIGN PATENT DOCUMENTS

| | | |
|---|---|---|
| DE | 10 12 532 B | 7/1957 |
| DE | 12 09 012 B | 1/1966 |
| EP | 1 162 082 B1 | 1/2006 |
| EP | 1 288 054 B1 | 5/2006 |
| EP | 1 145 894 B1 | 8/2008 |

* cited by examiner

*Primary Examiner* — Ruth Ilan
(74) *Attorney, Agent, or Firm* — McGlew and Tuttle, P.C.

(57) ABSTRACT

A hub arrangement has hub parts which are rotatable relative to one another. Each hub is assigned a braking device, which is actuatable jointly with the braking device of the respective other hub.

16 Claims, 2 Drawing Sheets

HUB ASSEMBLY, IN PARTICULAR FOR DUAL WHEELS

CROSS REFERENCE TO RELATED APPLICATIONS

This application is a U.S. National Phase Application of International Application PCT/EP2012/061306 filed Jun. 14, 2012 and claims the benefit of priority under 35 U.S.C. §119 of German Patent Application DE 10 2011 078 132.3 filed Jun. 27, 2011, the entire contents of which are incorporated herein by reference.

FIELD OF THE INVENTION

The invention relates to hub arrangements, in particular for twin wheels, with two hub parts that are rotatable relative to one another and associated braking arrangement.

BACKGROUND OF THE INVENTION

It is generally known and usual to provide axles with twin wheels on heavy-duty utility vehicles, for example on forklift trucks for large ship containers, in order to be able to guarantee extreme loading capacities. In this case it is desirable to arrange the twin wheels to be rotatable relative to one another in order to avoid undesirable slip during turning maneuvers of the vehicle and to avoid severe wear of the tyres of the twin wheels associated with this. U.S. Pat. No. 7,757,795 B2 shows a suitable hub arrangement for this type of twin wheels, in which the wheel hub parts carrying the two twin wheels are rotatably mounted on a (third) intermediate hub part, which on the other hand forms the input of a differential gear driving the wheel hub parts. For this purpose, gear wheels are arranged rotatable on an axially middle portion of the intermediate hub about axles which are perpendicular to the circumference of the intermediate hub part. These gear wheels mesh with toothing rings on the axial ends of the wheel hub parts facing one another, so that the wheel hub parts are only rotatable in directions opposing one another relative to the intermediate hub part. The intermediate hub part is driven via a planetary gear set and braked by means of a wet multiple disc brake. In order to be able to transmit to each wheel hub part a predetermined minimum driving moment or minimum braking moment, slide bearings which are subject to friction are provided in each case between the intermediate hub part and the wheel hub parts, while the differential arrangement additionally operates with friction predetermined by design as well.

All the same, this known hub arrangement is always problematic during braking manoeuvres when the twin wheels, because of road irregularities, are clearly loaded differently and have a correspondingly different traction. The same applies also when the twin wheels roll over road sections with very different friction coefficients. In all these cases it can happen that during a braking manoeuvre the twin wheel with good traction continues to roll largely unbraked while the twin wheel with poor traction slips with direction of rotation opposite to that of the former twin wheel.

A similar arrangement by design and function is the subject of U.S. Pat. No. 2,267,362. In this case, design measures for inhibiting the differential arrangement between the wheel hub parts are provided. In this connection it is utilized that gear wheels of the differential arrangement displace hydraulic lubricants in the differential arrangement in the manner of gear pumps. In this case, increased throttling resistances have to be overcome through design measures according to U.S. Pat. No. 2,267,362 so that the intermediate hub part during driving and braking operation transmits corresponding minimum moments to the wheel hub parts each. All the same, the case may arise under unfavorable conditions that the utilizable braking moments only have the (comparatively low) dimension of the aforementioned minimum moments.

EP 1 288 054 B1 shows the drive of the wheel hub parts of twin wheels via a differential arrangement. In this case, the wheel hub parts are each formed as a hollow wheel of a planetary gear set with planet wheels being rotatably mounted on a stationary planet carrier. The planet wheels each mesh with a sun wheel, which on the other hand is driven via one of the output shafts of the differential arrangement. No measures for transmitting braking forces onto the wheel hub parts are described whatsoever.

EP 1 145 894 B1 shows a twin wheel arrangement, in which the wheel hub parts can be non-positively coupled to one another and only one hub part is directly driven or braked. In this case, it must therefore be always ensured during braking maneuvers on a problematic surface that the wheel hubs are coupled together, which is technically difficult and associated with major construction effort.

EP 1 162 082 B1 on the other hand shows a twin wheel arrangement, the wheel hub parts of which are driven via a differential arrangement. In this case, the differential arrangement is combined with a step-down transmission on the input side in order to be able to transmit high driving moments to the output sides of the differential arrangement if required. No measures whatsoever for enforcing a synchronisation of the wheel hubs are shown.

SUMMARY OF THE INVENTION

This is where the invention starts in that at least each of two hubs is assigned a braking arrangement, which can be actuated jointly with the respective other braking arrangement.

In particular, it is an object of the invention to ensure with absolute safety, with a hub arrangement of the type stated at the outset, that on actuating the braking arrangement, braking moments of comparable magnitude become active on both hub parts.

According to the invention, this object is attained in that the braking arrangement comprises braking devices assigned to the hub parts, and in that on actuating the braking device assigned to the one hub part reaction forces that occur act as actuation force of the braking device assigned to the other hub part.

The invention is based on the general idea of discharging the forces, which are necessary for actuating the one braking device, to stationary parts via the other braking device. Thus, the two hub parts are necessarily braked jointly with comparable moments.

In the case of a hub arrangement provided for twin wheels, in which the wheel hubs are driven via a differential arrangement, the invention can also be realized in that the one braking device is assigned to a wheel hub part and the other braking device to an intermediate hub part of the differential arrangement.

Otherwise, it can be provided for driving the wheel hub parts to merely drive one hub part directly and to couple the other hub part to this hub part in a non-positive and/or positive manner when required.

With respect to further advantageous features, reference is made to the claims and the following explanation of the drawing, with the help of which a particularly preferred embodiment of the invention is described in more detail.

Protection is not only claimed for stated or shown feature combinations, but generally also for any combinations of the stated or shown individual features. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
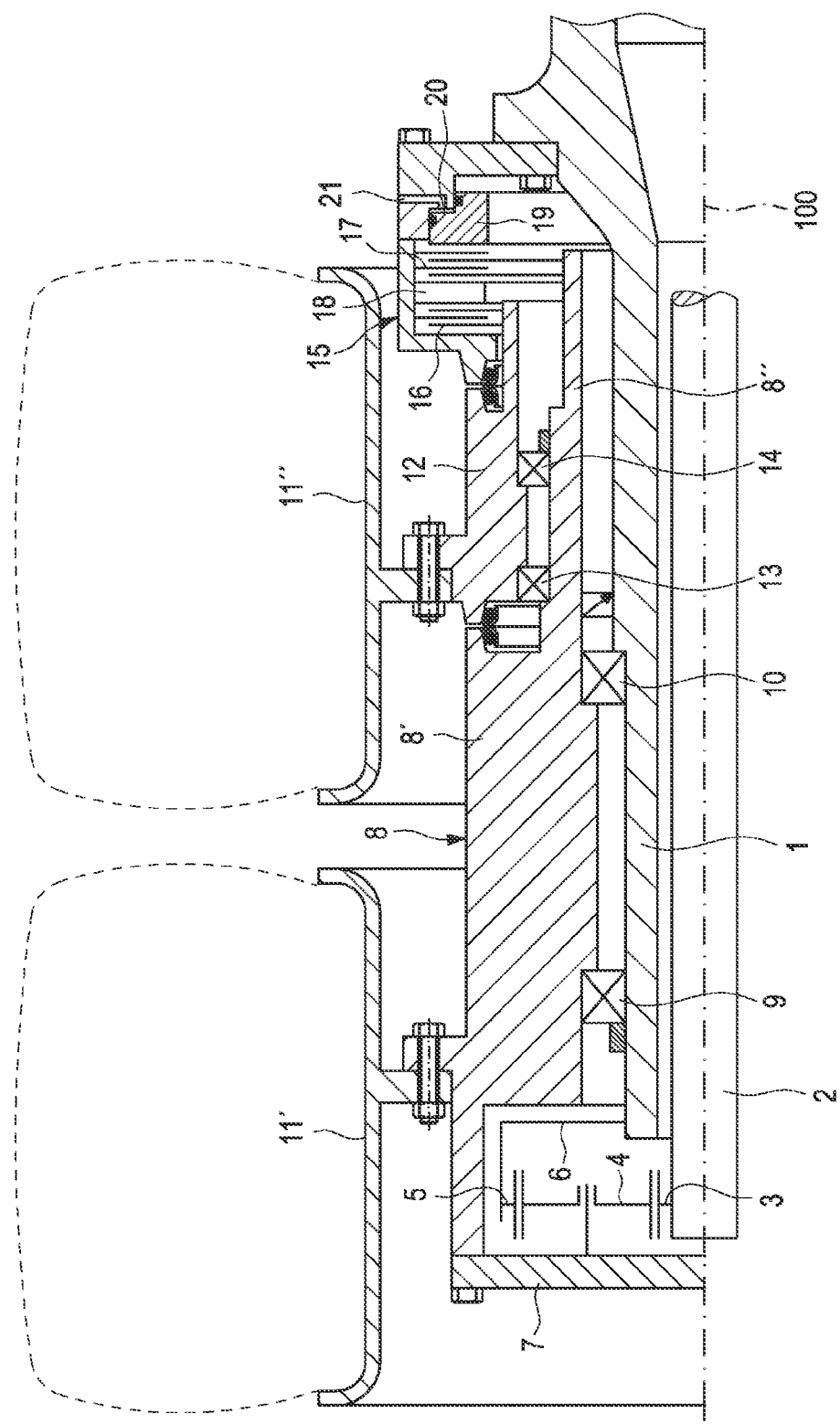
FIG. 1 is an axial sectional view of an embodiment of the hub arrangement according to the invention.

Referring to the drawings in particular, the sectional images of FIGS. 1 and 2 each show "half sections", in which only the region above a central axis 100 is shown and the region below this axis 100 is symmetrical to the shown section.

According to FIG. 1, the shown hub arrangement comprises an axle tube 1, which receives a drive input shaft 2. On the left end of FIG. 1, the drive input shaft 2 carries a sun wheel 3 which is positively connected to the shaft 2, which sun wheel 3 meshes with planet wheels 4 in the manner known in principle, which circulate in a hollow wheel 5 provided with teeth on the inside, which is connected to the axle tube 1 in a rotationally fixed manner by means of a bell-like carrier 6. The planet wheels 4 are rotatably mounted on axle journals of a planet carrier 7, which on the other hand is connected to a hub part 8 in a rotationally fixed manner, which is rotatably mounted on rolling bearings 9 and 10, which are arranged on the axle tube 1 or a cylindrical extension (not shown) of the hollow wheel carrier 6 arranged on the axle tube 1.

The hub part 8 comprises a section 8' supported on the bearings 9 and 10 and a section 8" axially projecting beyond the bearing 10. In this case, the left section 8' serves for holding the rim 11' of an outer twin wheel. The right section 8" of the hub part 8 carries a further hub part 12, which is rotatably mounted on the section 8" of the hub part 8 by means of rolling bearings 13 and 14 arranged there. The hub part 12 has a same outer diameter as the hub part 8 in the region of the rim 11'. Accordingly, a same type of rim 11" can be arranged on the hub part 12 for an inner twin wheel.

In FIG. 1, at the right end of the axle tube 1, a brake housing 15, which is connected therewith in a fixed manner, is arranged. The brake housing 15 is open, on a side of the brake housing 15, facing the hub parts 8 and 12 in such a manner that the outer circumference of the axle tube 1 and the edge of the opening of the brake housing 15 a ring opening is formed, through which the hub parts 8 and 12 with cylindrical axial end regions project. In this case, the axial end region of the hub part 8 or of the part 8" project further into the brake housing 15 in axial direction than the axial end region of the hub part 12 arranged radially above.

Radially between the inner circumference of the brake housing 15 and the outer circumference of the axial end region of the hub part 12 or of the axial end region of the hub part 8, brake disc packs 16 and 17 each are arranged. Each of brake the disc packs 16 and 17 include braking discs on the brake housing side, which in an inner circumferential toothing of the brake housing are arranged axially displaceably however in a rotationally fixed manner, and braking discs on the hub side, which are arranged in analogous manner on outer circumferential toothings of the axial ends of the hub parts 8 and 12 in a rotationally fixed manner, however axially displaceably. In this case, braking discs on the brake housing side and hub part side are alternately arranged in axial neighborhood in the known manner, i.e. a brake disc on the hub part side each is axially arranged between two braking discs on the brake housing side. Axially between the braking disc packs 16 and 17, a ring plate 18 is arranged on the inner toothing on the brake housing side in an axially displaceable and rotationally fixed manner.

Within the brake housing 15, an axially displaceable ring piston 19 is furthermore arranged. The ring piston 19 has a right end in FIG. 1 that is designed stepped in such a manner that, in the region of the piston step between the brake housing wall and the ring piston 19, a ring chamber 20 is formed, which via a bore 21 can be controllably supplied with pressure fluid. The ring piston is thereby axially pushed against the brake disc packs 16 and 17 with corresponding force against the resistance of a resetting spring arrangement (not shown), wherein the axial pressure of the ring piston 19 exerted on the brake disc pack 17 is discharged via the axially displaceable ring plate 18 to the brake disc pack 16 and subsequently to the stationary brake housing 15. As a result, both brake disc packs 16 and 17 thus effect braking, so that both hub parts 8 and 12 are simultaneously braked with the twin wheels 11' and 11" arranged thereon.

Figure 2:
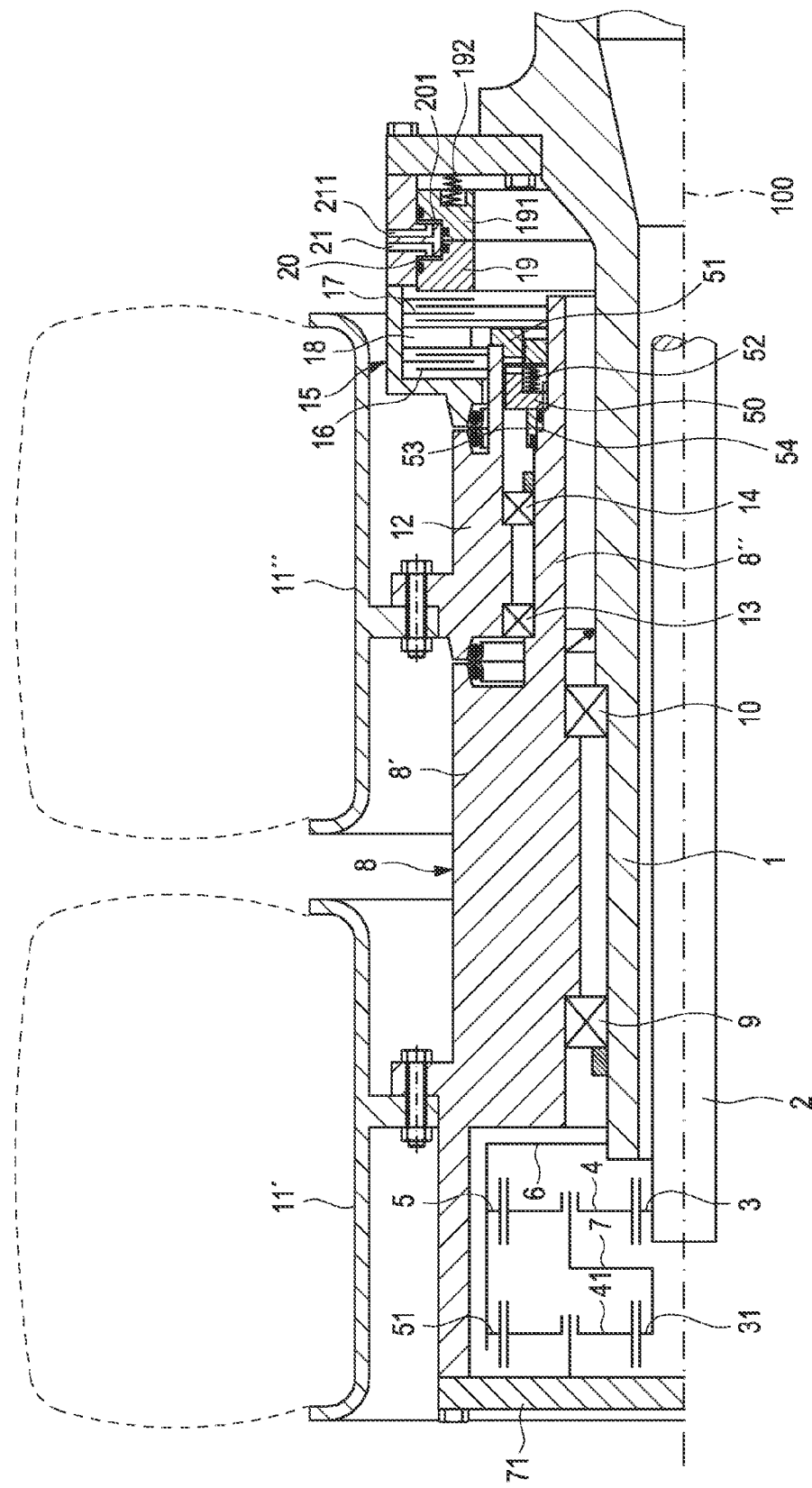
FIG. 2 is an axial sectional view of a similar embodiment with additionally provided possibility of coupling the twin wheels when using the hub arrangement for said twin wheels.

The embodiment of FIG. 2 differs from the embodiment of FIG. 1 initially in that the drive input shaft 2 and the hub part 8 are drive-connected to one another via a two-stage planetary gear set. The drive input shaft 2 on the other hand carries a sun wheel 3 which is connected to it in a rotationally fixed manner, which on the other hand meshes with planet wheels 4, which on the other hand circulate in an internally toothed hollow wheel 5. The planet wheels 4 on the other hand are rotatably mounted on axle journals of the planet carriers 7. This planet carrier 7 is connected to a further sun wheel 31 in a rotationally fixed manner, which sun wheel 31 meshes with planet wheels 41, which circulate in an internally toothed hollow wheel 51, which like the hollow wheel 5 is stationarily held on the axle tube 1 via the bell-shaped carrier 6. The hollow wheels 5 and 51 as a rule form a single hollow wheel, which has a corresponding axial width and accordingly interacts with an in the drawing right axial section with the planet wheels 4 and with an in the drawing left axial section with the planet wheels 41. The planet wheels 41 are rotatably mounted on axle journals of a planet carrier 71, which on the other hand is connected to the hub part 8 in a rotationally fixed manner.

Within the brake housing 15, a first and a second ring piston 19 and 191 are arranged, wherein the ring piston 19 on the other hand can be pushed axially against the brake disc packs 16 and 17 through pressure loading of the ring chamber 20, so that the hub parts 8 and 12 are necessarily braked simultaneously. The further ring piston 191 is pushed through springs 192 against the facing face end of the ring piston 19 in such a manner that the aforementioned brake disc packs 16 and 17 are again axially compressed and effect braking because of this. Through pressure loading a ring chamber 201, which can be supplied with a pressure fluid via a bore 21, the ring piston 191 can be shifted to the right against the force of springs 192, so that the ring piston 19 is unloaded of the ring piston 191 and can merely impress the brake disc packs 16 and 17 effecting braking in axial direction when the ring chamber 20 assigned to the ring piston 19 is loaded with pressure fluid via the bore 21. Through the shown double piston arrangement 19, 191, an automatic parking brake can thus be ensured on the one hand, when the ring chamber 201 is pressureless and the ring piston 191 axially presses against the ring piston 19 through the springs 192. During driving operation, the ring chamber 201 is pressure loaded so that the ring piston 191 is held axially moved away or spaced from the ring piston 19 and the brake disc packs 16 and 17 only effect braking when the ring chamber 20 assigned to the ring piston 19 is loaded with pressure.

Otherwise, the possibility of positively coupling the hub parts 8 and 12 to one another is provided with the embodiment of FIG. 2. To this end, a dog ring 50 is arranged axially displaceably but rotationally fixedly on the hub part 8, and the hub part 12 is connected to a dog ring 51 in a fixed manner. These dog rings face one another with dogs arranged on the face end. The dog ring 50 can be axially pushed against the dog ring 51 against the force of a resetting spring 52 by means of a ring piston 53, so that the dogs of the two rings 50 and 51 enter into engagement. The ring piston 53 is formed as a stepped piston on its side facing away from the dog ring 50 and together with a corresponding step-like (stepped) outer circumferential surface on the hub part 8 limits a ring space 54, which via a bore in the hub part 8 which is not shown or a pressure lead-through in the axle housing which is likewise not shown can be loaded with pressure fluid or unloaded of pressure fluid, i.e. upon pressure loading of the ring space 54, the dog ring 50 is brought to engage with the dog ring 51, so that the two dog rings 50 and 51 and accordingly the hub parts 8 and 12 are positively coupled to one another. Upon pressure unloading of the ring space 54, the resetting spring 52 shifts the dog ring 50 again into the shown left end position, in which the dog rings 50 and 51 are decoupled from one another and the hub parts 8 and 12 can rotate relative to one another. If required, the hub parts 8 and 12 and accordingly the rims 11' and 11" of a twin wheel arrangement can thus be simultaneously driven in synchronisation.

Deviating from the representation of FIGS. 1 and 2, the hub 12 instead of via the rolling bearings 13 and 14 could also be rotatably mounted via the slide bearings on the hub 8, so that the two hubs 8 and 12 always remain coupled to one another through a non-positive connection predetermined by the friction of the slide bearings.

With respect to the assembly of the rims 11' and 11" on the hubs 8 and 12, FIG. 1 and FIG. 2 show an advantageous possibility of arranging rims 11' and 11" of twin wheels on axially adjacent hubs 8, 12 with same outer diameters. For fastening twin wheels on the associated hubs 8, 12, lobe-like (lobe flanges or hub flanges) flanges are provided. Each of the hub flanges radially projects to the outside in a radial plane. The hub flanges are spaced from one another in circumferential direction. The rims 11', 11" have, on the inner circumferential side, lobe-like (lobe flanges or rim flanges) flanges which are substantially complementary to the hub flanges and are directed radially inwardly. The rim flanges are provided in such a manner that on the one hand the rims 11', 11", in a position that is concentric to the hub axis upon appropriate rotary position, are axially moveable over and beyond the radial plane and, on the other hand, the hub flanges on the hub side and the rim flanges on the rim side, upon suitable rotary position of the rim, can be placed onto one another for the fastening of the respective rim 11', 11" to the respective hub 8, 12.

While specific embodiments of the invention have been shown and described in detail to illustrate the application of the principles of the invention, it will be understood that the invention may be embodied otherwise without departing from such principles.

The invention claimed is:

1. A hub arrangement for twin wheels, the hub arrangement comprising:
    two hubs which are rotatable relative to one another;
    a brake housing with an abutment wall;
    a braking arrangement assigned to each of the two hubs, each braking arrangement being actuatable jointly with the respective other braking arrangement; and
    a pressure unit on a brake housing side, wherein:
    the two hubs have axial end portions which are equi-axial with respect to one another and axially project into the brake housing;
    the brake arrangement includes a first brake disc pack radially between an end portion and an inner circumference of the brake housing and a second brake disc pack radially between another end portion and the inner circumference of the brake housing;
    the second brake disc pack is arranged axially adjacent to the first brake disc pack;
    each of the brake disc packs is shiftable in an axial direction against the abutment wall of the brake housing by means of the pressure unit.

2. The hub arrangement according to claim 1, wherein one of the two hubs is formed as a gear hub and is driveable via a single or multi-stage gear set.

3. The hub arrangement according to claim 2, wherein said one of the two hubs is driveable via a two-stage planetary gear set.

4. The hub arrangement according to claim 1, wherein:
    the pressure unit comprises a fluidic two-piston unit;
    a piston of the two-piston unit, when fluidically pressure loaded, axially compresses or shifts the disc packs against the abutment wall of the brake housing; and
    a further piston of the two-piston unit, through springs, is axially loaded against the disc packs and, upon fluidic pressure loading against the force of the springs, the further piston is axially moved away from the disc packs.

5. The hub arrangement according to claim 4, wherein:
    the further piston is arranged axially adjacent to the piston; and
    the springs loaded against this piston is arranged axially displaceably.

6. The hub arrangement according to claim 1, further comprising:
    two rims associated with the two hubs, each of the two rims having rim lobe-like flanges on an inner circumferential side of the respective rim, wherein:
    the two hubs each have hub lobe-like flanges for fastening twin wheels on the associated hubs;
    the hub lobe-like flanges each project radially to the outside in a radial plane and are spaced from each other in the circumferential direction;
    the rim lobe-like flanges are substantially complementary to the hub lobe-like flanges and are directed radially inwardly;
    the rims, in a position that is concentric to the hub axis upon appropriate rotary position, are axially moveable over and beyond the radial plane; and
    the hub lobe-like flanges and the rim lobe-like flanges, upon suitable rotary position of the rim, can be placed onto one another for the fastening of one of the rims to the respective one of the hubs.

7. The hub arrangement according to claim 1, wherein one of the two hubs is rotatably mounted on the other of the two hubs.

8. The hub arrangement according to claim 7, wherein the one of the two hubs rotatably mounted on the other of the two hubs by means of a slide bearing.

9. A hub arrangement comprising:
a first hub;
a second hub, the first hub and the second hub being coaxial and being rotatable relative to each other;
a brake housing with an abutment wall;
a first braking arrangement assigned to the first hub, the first braking arrangement including a first brake disc pack disposed in a radial direction between a first hub end portion and an inner circumference of the brake housing;
a second braking arrangement assigned to the second hub, the second braking arrangement including a second brake disc pack disposed in the radially direction between a second hub end portion and the inner circumference of the brake housing, the second brake disc pack being arranged axially adjacent to the first brake disc pack; and
a pressure unit connected to the brake housing side, each of the first brake disc pack and the second brake disc pack being shiftable in an axial direction against the abutment wall of the brake housing by means of the pressure unit and each of the first braking arrangement and the second braking arrangement being actuatable jointly with the respective other braking arrangement.

10. The hub arrangement according to claim 9, further comprising a gear set comprising a single or multi-stage gear set, wherein one of the first hub and the second hub is formed as a gear hub and is driveable via the gear set.

11. The hub arrangement according to claim 10, wherein the gear set comprises a two-stage planetary gear set.

12. The hub arrangement according to claim 9, wherein:
the pressure unit comprises a fluidic two-piston unit;
a piston of the two-piston unit, when fluidically pressure loaded, axially compresses or shifts the first brake disc pack and the second brake disc pack against the abutment wall of the brake housing; and
a further piston of the two-piston unit, through springs, is axially loaded against the disc packs and, upon fluidic pressure loading against the force of the springs, the further piston is axially moved away from the disc packs.

13. The hub arrangement according to claim 12, wherein:
the further piston is arranged axially adjacent to the piston; and
the springs loaded against this piston is arranged axially displaceably.

14. The hub arrangement according to claim 9, further comprising:
two rims associated with the two hubs, each of the two rims having rim lobe-like flanges on an inner circumferential side of the respective rim, wherein:
the two hubs each have hub lobe-like flanges for fastening twin wheels on the associated hubs;
the hub lobe-like flanges each project radially to the outside in a radial plane and are spaced from each other in the circumferential direction;
the rim lobe-like flanges are substantially complementary to the hub lobe-like flanges and are directed radially inwardly;
the rims, in a position that is concentric to the hub axis upon appropriate rotary position, are axially moveable over and beyond the radial plane; and
the hub lobe-like flanges and the rim lobe-like flanges, upon suitable rotary position of the rim, can be placed onto one another for the fastening of one of the rims to the respective one of the hubs.

15. The hub arrangement according to claim 9, wherein one of the two hubs is rotatably mounted on the other of the two hubs.

16. The hub arrangement according to claim 15, wherein the one of the two hubs rotatably mounted on the other of the two hubs by means of a slide bearing.

* * * * *